(12) United States Patent
Weng et al.

(10) Patent No.: US 8,807,897 B2
(45) Date of Patent: Aug. 19, 2014

(54) FASTENING ASSEMBLY AND METHOD FOR MANUFACTURING FASTENING ASSEMBLY AT CASE

(75) Inventors: Chao-Chin Weng, Taipei (TW); Hsin-Chin Chen, Taipei (TW); Chin-Lai Lin, Taipei (TW); Teng-Shan Lai, Taipei (TW); Yu-Ju Tsai, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 646 days.

(21) Appl. No.: 12/839,418

(22) Filed: Jul. 20, 2010

(65) Prior Publication Data

US 2011/0091299 A1   Apr. 21, 2011

(30) Foreign Application Priority Data

Oct. 16, 2009 (TW) .............................. 98135172 A

(51) Int. Cl.
| | |
|---|---|
| *F16B 37/06* | (2006.01) |
| *B29C 45/00* | (2006.01) |
| *B29C 65/02* | (2006.01) |
| *B29C 65/00* | (2006.01) |
| *B29L 31/34* | (2006.01) |
| *B29C 65/56* | (2006.01) |
| *B29C 65/60* | (2006.01) |
| *F16B 37/00* | (2006.01) |

(52) U.S. Cl.
CPC ............. *B29C 66/534* (2013.01); *B29C 66/474* (2013.01); *B29L 2031/3481* (2013.01); *B29C 65/561* (2013.01); *B29C 66/304* (2013.01); *B29C 65/562* (2013.01); *B29C 65/606* (2013.01); *B29C 66/21* (2013.01); *B29C 66/612* (2013.01); *F16B 37/005* (2013.01); *F16B 37/061* (2013.01); *B29C 45/006* (2013.01); *F16B 37/065* (2013.01); *B29C 66/5344* (2013.01); *B29C 65/02* (2013.01)
USPC ........................................... 411/171; 411/183

(58) Field of Classification Search
CPC ........ F16B 37/061; F16B 5/08; F16B 37/065; F16B 33/002; F16B 37/044; F16B 37/048; B23K 35/0288; B29C 66/47; B29C 65/0672; B23P 19/062
USPC ........................................... 411/427, 171, 183
See application file for complete search history.

(56) References Cited

U.S. PATENT DOCUMENTS 3,199,566 A * 8/1965 Dyka ............................. 411/171
3,821,052 A * 6/1974 Tanzer ........................... 411/258

(Continued)

FOREIGN PATENT DOCUMENTS

| JP | H0513095 Y2 | 4/1993 |
|---|---|---|
| JP | H1093259 A | 4/1998 |
| TW | 343819 | 10/1998 |
| TW | 381737 | 2/2000 |

*Primary Examiner* — Gay Ann Spahn
(74) *Attorney, Agent, or Firm* — Winston Hsu; Scott Margo

(57) ABSTRACT

This invention provides a fastening assembly and a method for manufacturing the fastening assembly. The method for manufacturing the fastening assembly is used for an electronic apparatus. The electronic apparatus includes a first case. The method at least includes the following steps. A boss is embedded into a seat by hot melting to allow the boss and the seat to form a first fastening element, and the boss has a screwed hole. Then, the first fastening element is disposed at the first case by hot melting.

4 Claims, 4 Drawing Sheets

(56) References Cited

U.S. PATENT DOCUMENTS

| | | | |
|---|---|---|---|
| 4,768,968 A * | 9/1988 | Daggett et al. | 439/246 |
| 6,587,657 B2 * | 7/2003 | Sirejacob | 399/106 |
| 6,637,095 B2 * | 10/2003 | Stumpf et al. | 411/171 |
| 8,217,300 B2 * | 7/2012 | Hill | 219/121.64 |
| 2001/0026706 A1 * | 10/2001 | Sirejacob | 399/106 |
| 2002/0028122 A1 | 3/2002 | Kuo | |
| 2005/0157450 A1 * | 7/2005 | Liao et al. | 361/620 |
| 2006/0255674 A1 * | 11/2006 | Chen et al. | 310/90 |
| 2006/0291974 A1 * | 12/2006 | McGee et al. | 411/171 |
| 2007/0048106 A1 * | 3/2007 | Christ et al. | 411/82 |
| 2007/0212193 A1 * | 9/2007 | Wang | 411/171 |
| 2008/0050203 A1 * | 2/2008 | Dowling | 411/531 |
| 2010/0226731 A1 * | 9/2010 | Hsieh et al. | 411/171 |
| 2014/0091051 A1 * | 4/2014 | Battilana | 211/119.003 |

\* cited by examiner

FASTENING ASSEMBLY AND METHOD FOR MANUFACTURING FASTENING ASSEMBLY AT CASE

CROSS-REFERENCE TO RELATED APPLICATIONS

This Non-provisional application claims priority under 35 U.S.C. §119(a) on Patent Application No(s). 098135172 filed in Taiwan, Republic of China on Oct. 16, 2009, the entire contents of which are hereby incorporated by reference.

BACKGROUND OF THE INVENTION

1. Field of the Invention

This invention relates to a fastening assembly and a method for manufacturing a fastening assembly and, more particularly, to a method in which a fastening assembly is first manufactured and then the fastening assembly is manufactured at a case.

2. Description of the Related Art

A case of an electronic apparatus is usually made of plastic, and fasteners such as screws are usually used for assembling a plastic assembly. FIG. 1 is a schematic diagram showing a plurality of fastening assemblies 10 for fastening a second case 30 to a first case 20 in the prior art. The fastening assembly 10 includes a seat 101, a boss 103, and a screw 105, and the boss 103 has a screwed hole (not shown) at an inner side. The second case 30 includes a plurality of fastening holes 301, and the position of the fastening hole 301 on the second case 30 corresponds to the position of the corresponding boss 103 on the first case 20.

FIG. 2 is a partial enlarged schematic diagram showing a connection place of the fastening assembly 10 and the first case 20 in FIG. 1. Generally speaking, the seats 101 at the first case 20 are integrally injected and molded with the first case 20. Then, the boss 103 is embedded into the corresponding seat 101 by hot melting. When the second case 30 needs to be fastened to the first case 20, the screw 105 can be screwed into the corresponding boss 103 via the corresponding fastening hole 301 of the second case 30. After the screws 105 are screwed into the boss 103 via the fastening holes 301, the second case 30 can be fastened to the first case 20. In FIG. 2, an angle or depth of the boss 103 hot melted into the corresponding seat 101 needs to be very accurate, or else the screw 105 may fail to be accurately screwed into the corresponding boss 103 further to cause the second case 30 to fail to be accurately fastened to the first case 20.

FIG. 3A and FIG. 3B are side views of the fastening assembly 10. An embedding surface of the seat 101 where the boss 103 is hot melted can be parallel to a bottom surface of the seat 101. That is, the embedding surface can be a flat surface. Otherwise, the embedding surface may not be parallel to the bottom surface of the seat 101. That is, the embedding surface can be an inclined plane. In addition, when one boss 103 is hot melted into one seat 101, although the yield of the fastening assembly 10 as the embedding surface of the seat 101 is a flat surface is better than that as the embedding surface is an inclined plane, the yield of the fastening assembly 10 is mostly only 95%. However, the yield mentioned above is for facilitating elaboration of the objective of the invention, and the practical yield is obtained by manufacture statistics.

According to the above, the yield of the whole group of the fastening assembly 10 may decrease to about 60% (i.e., about 0.95 to the tenth power) while supposing that the first case 20 includes ten fastening assemblies 10 and the yield of each fastening assembly 10 is about 95%. That is, since the ten seats 101 are simultaneously injected and molded with the first case 20 first, once one of the boss 103 fails to be accurately embedded into the corresponding seat 101 by hot melting, the first case 20 including the ten seats 101 and the boss 103 embedded into the seats 101 by hot melting may be all scrapped. Thus, the cost of the electronic apparatus will increase.

Since the seat 101 of the conventional fastening assembly 10 is simultaneously injected and molded with the first case 20 first, once the first case 20 includes a plurality of seats 101 and any one of the boss 103 fails to be accurately embedded into the corresponding seat 101 by hot melting, the whole first case 20 may be scrapped and fail to be reused.

BRIEF SUMMARY OF THE INVENTION

One objective of this invention is to provide a fastening assembly and a method for manufacturing a fastening assembly to improve yield of manufacturing the fastening assembly and to avoid problems of higher developing cost and unnecessary expense of electronic apparatus in the prior art.

This invention provides a method for manufacturing a fastening assembly for an electronic apparatus. The electronic apparatus includes a first case. The method at least includes the following steps. A boss is embedded into a seat by hot melting to allow the boss and the seat to form a first fastening element, and the boss has a screwed hole. The first fastening element is then disposed at the first case by hot melting.

This invention also provides a fastening assembly for fastening a first case and a second case of an electronic apparatus. The fastening assembly includes a first fastening element and a second fastening element. The first fastening element is disposed at the first case by hot melting, and the first fastening element has a boss and a seat. The boss is embedded into the seat by hot melting and the boss has a screwed hole. The second fastening element passes through a fastening hole of the second case and is screwed into the boss of the first fastening element to fasten the first case and the second case. After the boss is embedded into the seat by hot melting, the first fastening element is disposed at the first case by hot melting.

In the invention, the seat of the fastening assembly is not injected and molded with the first case simultaneously, that is, the seat is disposed at the first case by hot melting after the boss is embedded into the seat by hot melting. Therefore, according to the method in the invention, the yield of the first fastening element can be greatly improved further to improve the assembling yield of fastening the second case to the first case.

These and other features, aspects, and advantages of the present invention will become better understood with regard to the following description, appended claims, and accompanying drawings.

DETAILED DESCRIPTION OF THE INVENTION

Figure 1:
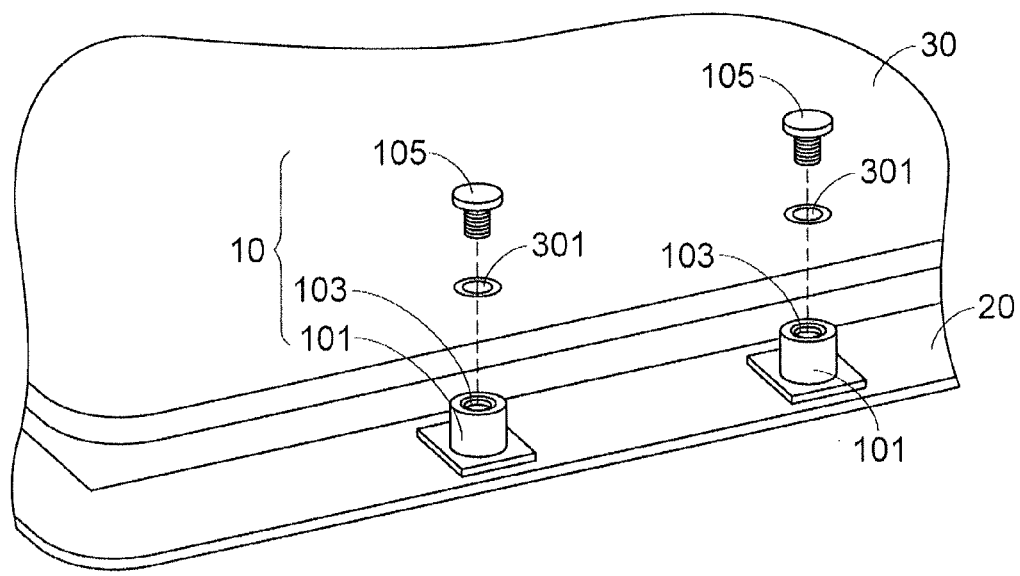
FIG. 1 is a schematic diagram showing a plurality of fastening assemblies for fastening a second case to a first case in the prior art.
Figure 2:
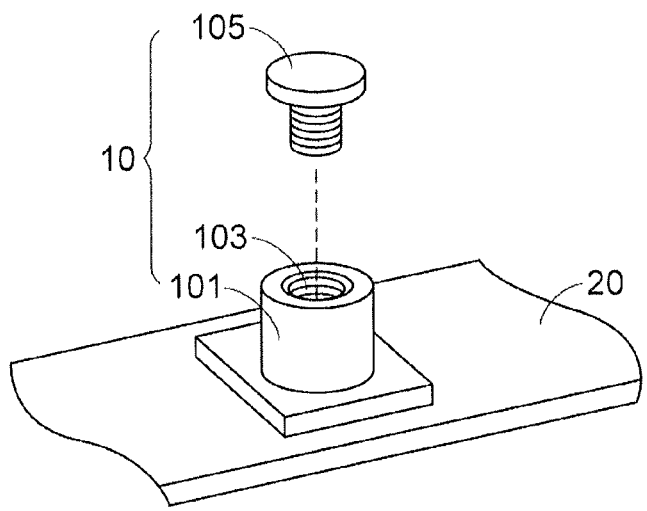
FIG. 2 is a partial enlarged schematic diagram showing a connection place of the fastening assembly and the first case in FIG. 1.
Figure 3A:
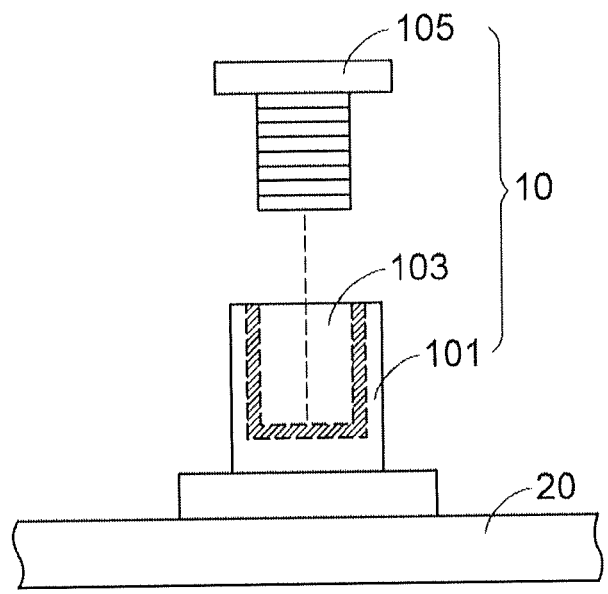
FIG. 3A is a side view of a fastening assembly, wherein an embedding surface of a seat where a boss is hot melted is a flat surface.
Figure 3B:
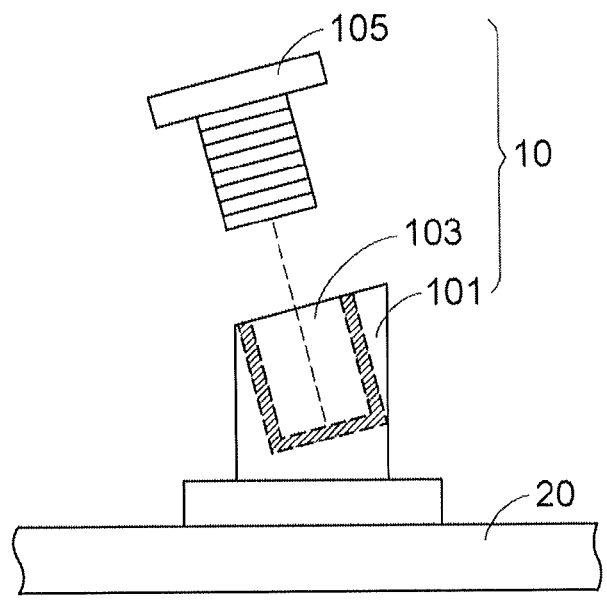
FIG. 3B is a side view of a fastening assembly, wherein an embedding surface of a seat where the boss is hot melted is an inclined plane.
Figure 4A:
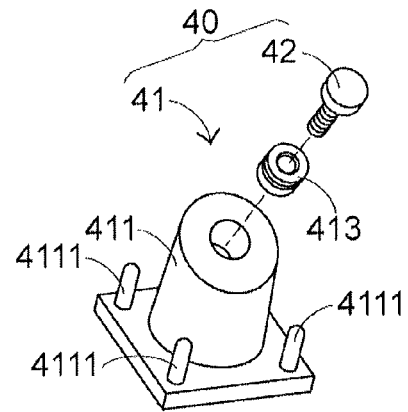
FIG. 4A to FIG. 4C are schematic diagrams showing manufacturing a fastening assembly according to one embodiment of the invention.
Figure 4B:
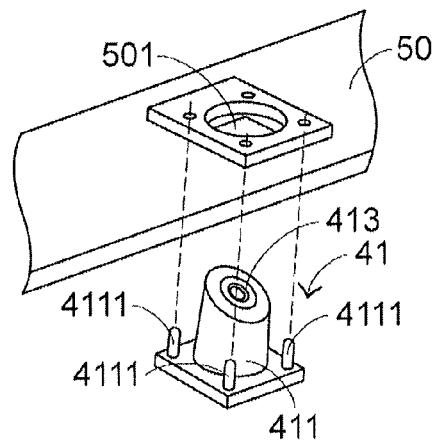
Figure 4C:
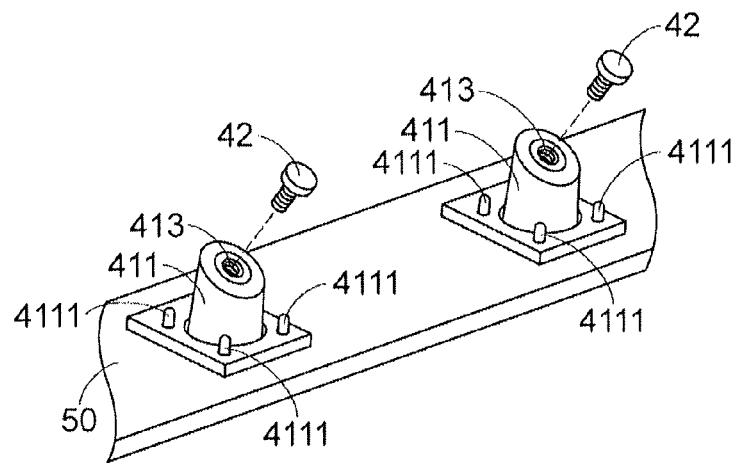

FIG. 4A to FIG. 4C are schematic diagrams showing manufacturing a first fastening element 41 according to one embodiment of the invention. In FIG. 4A to FIG. 4C, a fastening assembly 40 includes a first fastening element 41 and a second fastening element 42. The first fastening element 41 is disposed at a first case 50 by hot melting and has a seat 411 and a boss 413. The boss 413 is embedded into the seat 411 by hot melting and has a screwed hole (not shown). The second fastening element 42 can pass through a second case 60 (refer to FIG. 5) and be screwed into the boss 413 of the first fastening element 41 to fasten the first case 50 and the second case 60. The first fastening element 41 is disposed at the first case 50 by hot melting after the boss 413 is embedded into the seat 411 by hot melting. That is, the seat 411 and the first case 50 are injected and molded separately. Further, in one preferred embodiment, the first fastening element 41 will be inspected after the boss 413 is embedded into the seat 411 by hot melting to ensure the quality of the first fastening element 41. The qualified first fastening element 41 is then disposed at the first case 50 by hot melting, thus to greatly improve the manufacturing yield of the fastening assembly 40.

According to FIG. 4A to FIG. 4C, the method for manufacturing a fastening assembly in one embodiment of the invention is further described below. Referring to FIG. 4A, the seat 411 is injected and molded first, and the boss 413 is then embedded into the seat 411 by hot melting. An embedding surface of the seat 411 where the boss 413 is hot melted is an inclined plane, and the seat 411 further has a plurality of hot melting points 4111. The first fastening element 41 is then inspected after the boss 13 is embedded into the seat 411 by hot melting. If the first fastening element 41 is qualified, the first fastening element 41 passes through a fastening hole 501 of the first case 50 and is hot melted at the first case 50 via the hot melting points 4111 of the seat 411 as shown in FIG. 4B. When the qualified first fastening elements 41 are all hot melted at the first case 50, the second case 60 can be fastened to the first case 50 after the second fastening elements 42, i.e. screws, are screwed into the corresponding bosses 413 by passing through fastening holes 601 of the corresponding second case 60 as shown in FIG. 4C. In view of structural strength, the embedding surface of the seat 411 is fitted to an inner wall of the second case 60, which is not shown.

Figure 5:
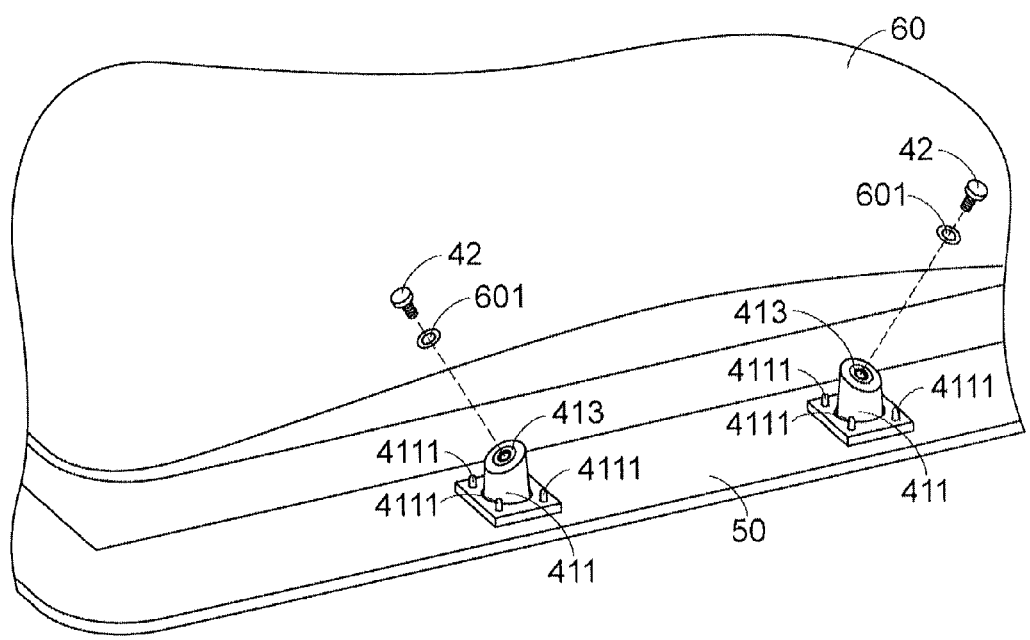
FIG. 5 is a schematic diagram showing fastening assemblies for fastening a second case to a first case according to one embodiment of the invention.

FIG. 5 is a schematic diagram showing the fastening assembly 40 for fastening the second case 60 to the first case 50 according to one embodiment of the invention. In FIG. 5, the seat 411 is hot melted at the first case 50 via the hot melting points 4111 thereon after the first fastening element 41 passes the inspection. After all of the qualified first fastening element 41 are hot melted at the first case 50, and the second fastening elements 42, i.e. screws, are screwed into the corresponding bosses 413 via the fastening holes 601 of the corresponding second case 60, the second case 60 can be fastened to the first case 50. In view of the structural strength, the embedding surface of the seat 411 can be fitted to the inner wall of the second case 60, which is not shown.

To sum up, the seat 411 is not simultaneously injected and molded with the first case 50, and the seat 411 and the first case 50 are injected and molded separately. That is, the seat 411 is disposed at the first case 50 by hot melting after the boss 413 is embedded into the seat 411 by hot melting. In addition, the first fastening elements 41 are all inspected thus to ensure that the first fastening elements 41 hot melted at the first case 50 are all qualified, further to improve the assembling yield of fastening the second case 60 to the first case 50.

Furthermore, If the seat 411 is inspected to be unqualified, only the single unqualified first fastening element 41 is scrapped since the seat 411 is still not disposed at the first case 50 by hot melting at that moment, and it is different from the conventional manufacture of the fastening assembly 10. During the conventional manufacture, all of the seats 101 simultaneously injected and molded with the first case 20 and the bosses 103 hot melted into the seats 101 are all scrapped. Compared with the prior art, according to the method for manufacturing a fastening assembly in the invention, manufacturing cost of the apparatus can be effectively reduced.

According to one preferred embodiment, the first case 50 and the second case 60 are made of plastic. However, the invention is not limited thereto.

Furthermore, in the embodiment of the invention, the fastening assembly 40 used for fastening the first case 50 and the second case 60 of the electronic apparatus is taken for example. However, the invention is not limited thereto. The fastening assembly 40 in the invention can also be used for fastening cases of any apparatus.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A fastening assembly for fastening a first case and a second case of an electronic apparatus, the fastening assembly comprising:
   a first fastening element disposed at the first case by hot melting, the first fastening element having a boss and a seat, wherein the seat comprises a base part, a cylindrical part, and a plurality of hot melting spots located on the base part of the seat and correspondingly passing through a plurality of perforations provided on the first case, and the boss is embedded into the cylindrical part of the seat by hot melting and has a screwed hole, wherein the first fastening element is disposed at the first case via using hot melting to the plurality of hot melting spots located on the base part of the seat; and
   a second fastening element passing through a fastening hole of the second case and screwed into the boss of the first fastening element to fasten the first case and the second case.

2. The fastening assembly according to claim 1, wherein an embedding surface of the seat where the boss is hot melted is an inclined plane.

3. The fastening assembly according to claim 2, wherein the embedding surface of the seat where the boss is hot melted is abutted on a surface of an inner wall of the second case, and the abutted surface of the inner wall of the second case is an inclined plane corresponding to the inclined plane of the embedding surface of the seat.

4. The fastening assembly according to claim 1, wherein the second fastening element is a screw.

* * * * *